Patented Mar. 27, 1951

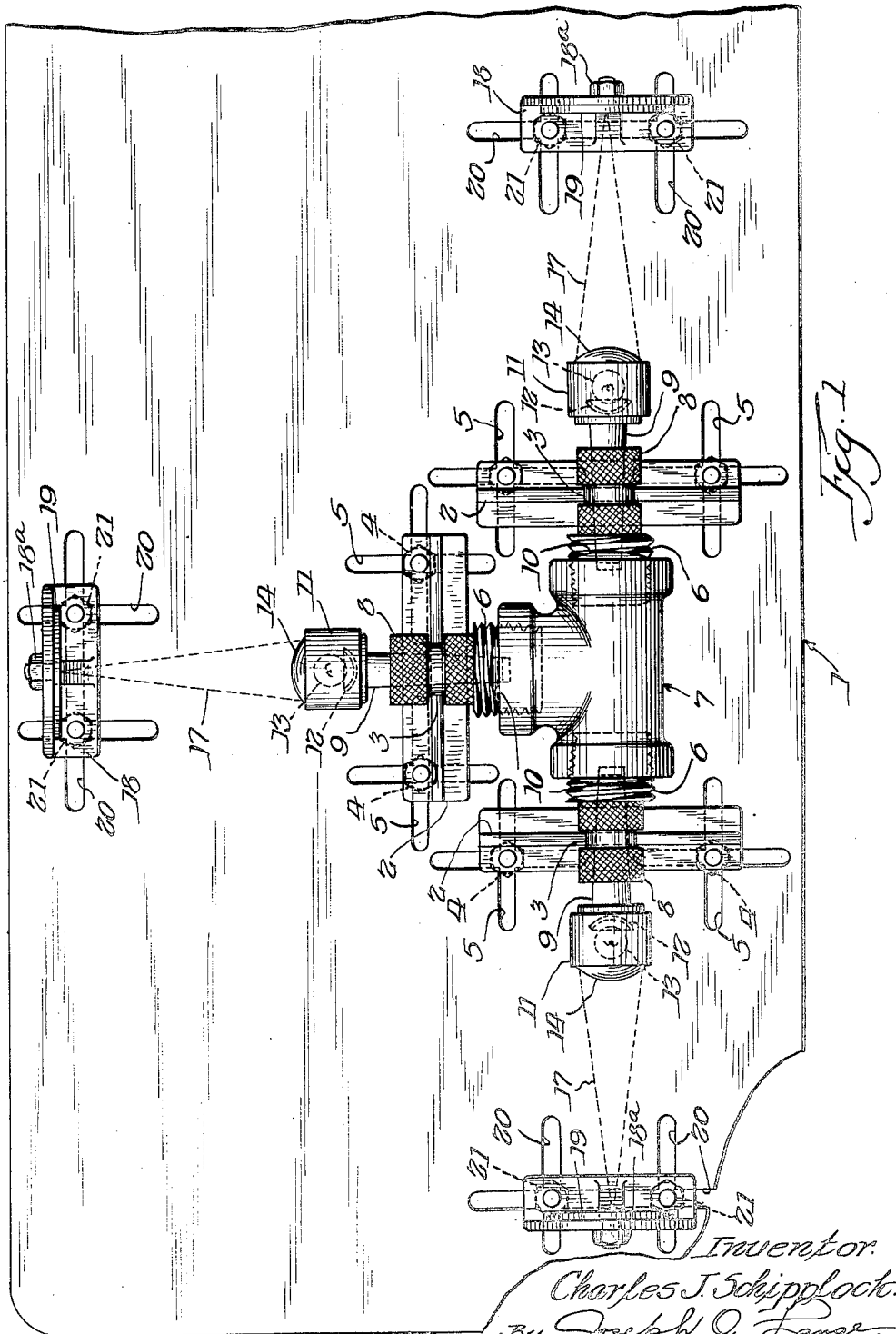

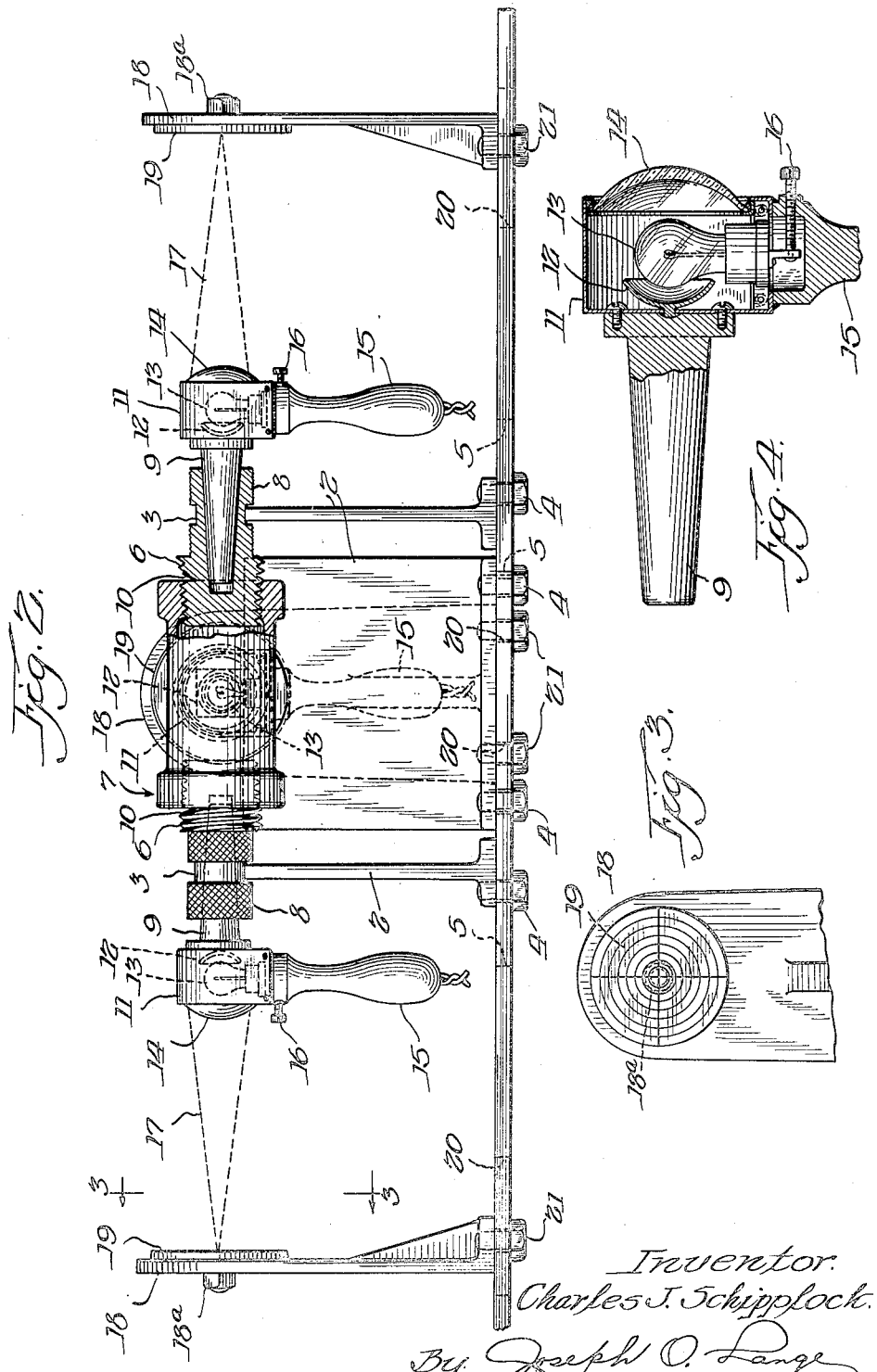

2,546,524

UNITED STATES PATENT OFFICE 2,546,524

GAUGING AND ALIGNMENT DEVICE FOR FITTINGS, BY LIGHT PROJECTION

Charles J. Schipplock, Chicago, Ill., assignor to Crane Co., Chicago, Ill., a corporation of Illinois Application August 27, 1948, Serial No. 46,468

1 Claim. (Cl. 88—24)

This invention relates to a combined gaging and alignment device for use where unusually accurate and fine measurements are required as hereinafter set forth. More particularly, it is concerned with a gaging device suitable for measuring the alignment of such closely machined devices as threaded or reamed fittings or other machined bores by means of light projection.

At the outset, in order to obtain a better understanding of this invention, it should be appreciated that heretofore in measuring the alignment of such fittings, say, T's, L's or crosses and other types of similar pressure retaining vessels in which the threads or bores thereof must be provided in accurate and predetermined relation to each other either in alignment or angularly or both it has been necessary to use large, heavy and frequently cumbersome lengths of pipe threaded or otherwise attached to the bore of the fitting in order to determine from an alignment or angular relationship whether or not such fitting has been properly tapped, reamed or bored. This operation was necessarily a relatively costly one, requiring considerable effort on the part of the individual and also being rather slow to accomplish it decreased the amount of daily production in this necessary operation.

Therefore, it is one of the more important objects of this invention to provide a means for quickly, easily and accurately gaging such fittings as aforesaid, avoiding the use of heavy methods heretofore employed and doing so in a manner which is relatively convenient and simple for the average operator to handle and thus dispensing with the skill of experienced shop personnel.

Another important object is to provide for a construction in which the operations for gaging may be minimized and rendered convenient to handle by combining the functions, reducing the usual physical effort required, reducing the expense and the amount of heavy equipment previously required for checking and inspecting for size and alignment of the end machined interiors.

Another important object is to provide for a construction in which the male thread or the bore gages normally used may be initially utilized for checking the thread or the bore respectively for size and then later supplementing the use of the same gages by means of light beam projecting lamps which are easily insertable by means of tapered shanks and sockets into the said first-named gages for the subsequent purpose of checking or determining the alignment by means of light beams projected as hereinafter described at length and having the same register on predeterminedly positioned adjustable targets or screens.

In contradistinction to the aforesaid objects, it should be understood that by prior methods separate or independent gages have been used for checking the accuracy of the threads or the bores for determining the proper size of fittings. These gages are then removed and alignment pipe preferably of substantial lengths are inserted into each opening to be checked and placed on an alignment inspection table in order to ascertain whether or not the article has been tapped, bored or otherwise machined within the required tolerance limits. Thus, it can be well appreciated that previous practices entailed slow, laborious and expensive operations.

In contrast, other objects and advantages of this invention will become more readily apparent upon proceeding with the following specification read in light of the accompanying drawings, in which Fig. 1 is a plan elevation assembly view of a device embodying my invention.

Fig. 2 is a side view of the device referred to in Fig. 1.

Fig. 3 is a fragmentary front view of the target or screen taken from the line 3—3 of Fig. 2.

Fig. 4 is a fragmentary sectional view of the conventional light projection lamp employed.

Similar reference numerals apply to similar parts throughout the several views.

Referring now to Fig. 1, for support purposes, a mounting plate is employed which is generally designated 1 and is preferably used to carry conveniently the device general assembly which is positioned upon it by means hereinafter described in detail. Of course, at the outset, it should be understood that depending upon the nature of the fitting being inspected and gaged, the holding means of the invention such as the supporting rail 2 may be of suitable cradle shape to accurately and snugly receive the projecting end or shank 3 of the thread gage 6. Each of the supporting holders 2 is adjustably positionable transversely and longitudinally relative to the upper surface of the plate 1 by means of the screws 4 more clearly shown in Fig. 2, and in order to allow for such adjustability with respect to the positioning on the plate 1, the latter is slotted as at 5 preferably lengthwise and transversely as indicated. Thus, depending upon the size and the type of the fitting being gaged, the cradling holders 2 may be suitably positioned accordingly. Therefore, one of the first steps required in order to determine whether or not the said cradling holders are in proper position is to assemble and screw the gages 6 up to the gaging notch 10 preferably by hand (usual practice) within the fitting 7 being inspected at all three positions as in the case of a T-fitting and by such threaded assembly the gage is mounted to fit accurately within the fitting (assuming the fitting is properly machined), the shank portion 3 of the gage is receivable within the cradle portion of the holder 2. It should be noted that each end of the knurled shank portions 8 of the gage 6 is hollow to receive snugly the tapered shank 9 of the beam projecting lamp 11. The detailed construction of the latter is more clearly shown in the enlarged view shown in Fig. 4 in which the lamp is provided with the reflector 12 immediately in front of which is the lamp bulb 13 and having the lamp chamber closed by the curved lens 14. Thus the lamp assembly described is snugly fitted and received within the gage upon its tapered shank 9, the lamp assembly being conveniently handled and positioned by means of the handle 15 and its projecting light beam being focussed by means of eccentric rotatability effected by the adjusting screw 16. The latter focusing is necessary in order that the beam of light represented by the dotted lines 17 (Figs. 1 and 2) may be properly focussed upon the target 18 which is suitably provided with centering or locating lines for the beam as shown more clearly in Fig. 3, the lines bearing the designation 19. As shown in Fig. 1, the targets are likewise adjustable transversely with respect to their position on the mounting plate 1, the latter adjustment being accomplished by means of the slots 20. The targets are then held in place by means of the bolts 21 after the targets have been properly located and suitably mounted upon the standard or upright by means of the bolts 18a.

It will be obvious that the apparatus of this invention may be adapted easily and conveniently for not only gaging screw threads upon fittings, fuses, pressure vessels or other articles, objects or devices of relatively similar shape or form, but it possesses the advantage over the ordinary methods heretofore employed in that not only may the operation be carried out very much more rapidly than when using conventional thread gages, snap gages, ring gages or the like, but also the prior difficulties in errors and delays due to the wear of the gage in handling will be largely eliminated.

Further, the apparatus may obviously be applied with advantage to the checking of ordinary standard gages employed in other gaging operations. However, the invention is not to be confined to the details of construction and arrangement hereinabove given by way of example, because the same may be substantially varied to suit varying practical requirements. Furthermore, any automatic or other feed devices for large production quantities may be employed in conjunction with the apparatus when it is required to gage a substantial amount of products of a particular class of article, and also other adjunct or accessory articles may be easily provided as found necessary depending upon the purposes for which the apparatus is to be employed.

Having now described my invention what I claim as new and desire to secure by Letters Patent is:

In means for gaging and aligning threaded fittings or the like on a work-piece by light projection, the combination including gages mounted in the fittings being gaged, a light beam projecting lamp having tapered shanks receivable in similar recesses in the said gages, adjustably movable target means for the light beams extending in a plurality of directions transverse the axes of the work-piece, the light beams of the projecting lamp registering on said target means to thereby indicate visually the alignment or misalignment of the said gages while mounted in the fittings.

CHARLES J. SCHIPPLOCK.

REFERENCES CITED

The following references are of record in the file of this patent:

UNITED STATES PATENTS

| Number | Name | Date |
|---|---|---|
| 1,206,502 | Bennett | Nov. 28, 1916 |
| 2,249,226 | Peters | July 15, 1941 |
| 2,353,372 | Simmons et al. | July 11, 1944 |
| 2,367,567 | Darby | Jan. 16, 1945 |
| 2,393,013 | Barnes et al. | Jan. 15, 1946 |
| 2,402,856 | Turrettini | June 25, 1946 |
| 2,405,441 | Martin | Aug. 6, 1946 |
| 2,422,294 | Dupont | June 17, 1947 |